SHIGETOSHI SUZUKI &
EISUKE TAKEDA
INVENTOR.
BY Stephen A. Frishauf
Atty

United States Patent Office 3,470,472
Patented Sept. 30, 1969

3,470,472

TRANSCEIVER USING COMMON COMPRESSION AMPLIFIER FOR TRANSMISSION AND RECEPTION

Shigetoshi Suzuki and Eisuke Takeda, Yokosuka-shi, Japan, assignors to Tokyo Shibaura Electric Co., Ltd., Kawasaki-shi, Japan, a corporation of Japan Filed Oct. 5, 1966, Ser. No. 584,418
Int. Cl. H04b *1/40*
U.S. Cl. 325—18 3 Claims

ABSTRACT OF THE DISCLOSURE

In a transceiver, a compression-type low frequency amplifier is coupled to the audio-frequency input device to compress the audio frequency input signal prior to amplitude modulation. The compressed signal is then utilized to effect amplitude modulation of a carrier wave for transmission. This increases the average degree of modulation during transmission and the compression-type amplifier is also used for automatic gain control during reception.

This invention relates to improvements relating to transceivers and more particularly to improvements relating to transmission devices thereof.

In transceivers, it is highly desirable to transmit signals over as large distance as possible with small transmitter outputs. To this end it has been the practice to increase as far as possible the average degree of modulation of the transmisison device within various limits such as tone quality, width of the frequency band employed and the like. However, if one tries to increase the average degree of modulation there is a possibility that so-called overmodulation will occur wherein the degree of modulation exceeds 100% at an instant during input signals. In order to prevent such an overmodulation while increasing the average degree of modulation it has been proposed to maintain the amplitude of the input modulating signal at a constant level by passing the signal through a clipper to the transmisison device. Although overmodulation can be precluded by such a means, distortion of the signal wave is inevitable because portions of the input modulating signals which exceed the clipping level are clipped off. As a consequence, an increase in the average degree of modulation is accompanied by a corresponding increase in the distortion so that it is difficult to sufficiently increase the average degree of modulation.

The principal object of this invention is to increase the average degree of modulation of transmission devices thereby to provide transceivers capable of transmitting signals as far as possible with small transmitter outputs.

Another object of this invention is to provide transceivers of good tone quality and with low distortion.

Still another object of this invention is to provide a novel transceiver of simple construction by providing a voice input amplifier section common to the transmission and reception devices and by switching the amplifier section either to the transmission device or to the reception device.

A further object of this invention is to provide a new and improved transceiver equipped with a novel reception device capable of performing automatic volume control without the aid of any particular automatic gain control circuit.

According to this invention the above and other objects can be attained by compressing the signal level of the input modulating signal such as voice by passing the signal through a compression type low-frequency amplifier instead of a clipper. The input modulating signal thus compressed is then utilized to effect amplitude modulation of the carrier wave to increase the average degree of modulation.

As is well known in the art, the following relation holds between the input voltage Vi and the output voltage Vo of a compression type low-frequency amplifier:

$$Vo=kVi^{\gamma}$$

where $\gamma<1$ and such amplifier has been widely used for the transmission and recording of aural signals and the like whose amplitude varies over a very wide range. Thus, by transmitting or recording aural signals after compressing them by the compression type amplifier and then reproducing the signals by means of an expander having $\gamma$ of reciprocal relation, the mean amplitude level will be increased, thus increasing the signal-to-noise ratio. This invention contemplates to utilize such a characteristic of the compression type low-frequency amplifier in the transmission device of the transceiver whereby to increase the average degree of modulation and hence to increase the distance of signal transmission without the accompanying problems of overmodulation and distortion.

The invention, as to its organization together with further objects and advantages thereof, may be understood by reference to the following description taken in connection with the accompanying drawings, in which.

Figure 1:
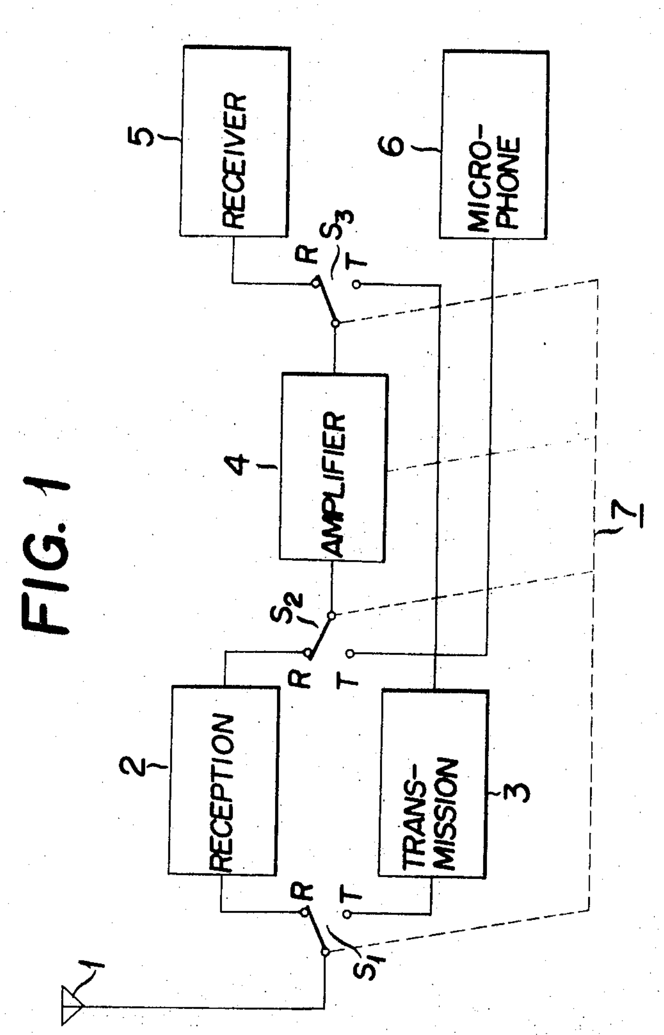
FIG. 1 is a schematic block diagram illustrating an arrangement of a transceiver embodying this invention.

As shown in FIG. 1, the transceiver of this invention comprises an antenna 1 utilized for both transmission and reception, a reception section 2, a transmission section 3, a compression type low-frequency amplifier 4, a receiver 5, a microphone 6 and a press-to-talk switch 7. More particularly, the antenna 1 for transmission and reception is connected to the input side of the reception section 2 via a first transfer switch $S_1$ of the press-to-talk switch 7. The reception section may be a common superheterodyne receiver consisting of a high-frequency amplifier, a local oscillator, a mixer, an intermediate-frequency amplifier and a demodulator. The output side of the reception section 2 is connected to the input side of the compression type low-frequency amplifier 4 via a second transfer switch $S_2$ of the press-to-talk switch 7. The output side of the compression type low-frequency amplifier 4 is connected to the receiver 5 via a third transfer switch $S_3$ of the press-to-talk switch 7. The microphone 6 is arranged to be connected to the input side of said compression type low-frequency amplifier 4 through the second transfer switch $S_2$, the output side of the amplifier 4 being connected to the transmission section 3 via the third transfer switch $S_3$. The transmission section 3 is comprised by an amplitude modulation transmitter consisting of a carrier oscillator, a modulator and a power amplifier in order to amplify and modulate the carrier wave by the aural signal from the microphone. The output side of the transmission section 3 is connected to the antenna 1 for transmission via the first transfer switch $S_1$. The first, second and third transfer switches $S_1$, $S_2$ and $S_3$ are interlocked together to form transmission and reception systems by a single operation of switching between transmisison side T and reception side R.

Figure 2:
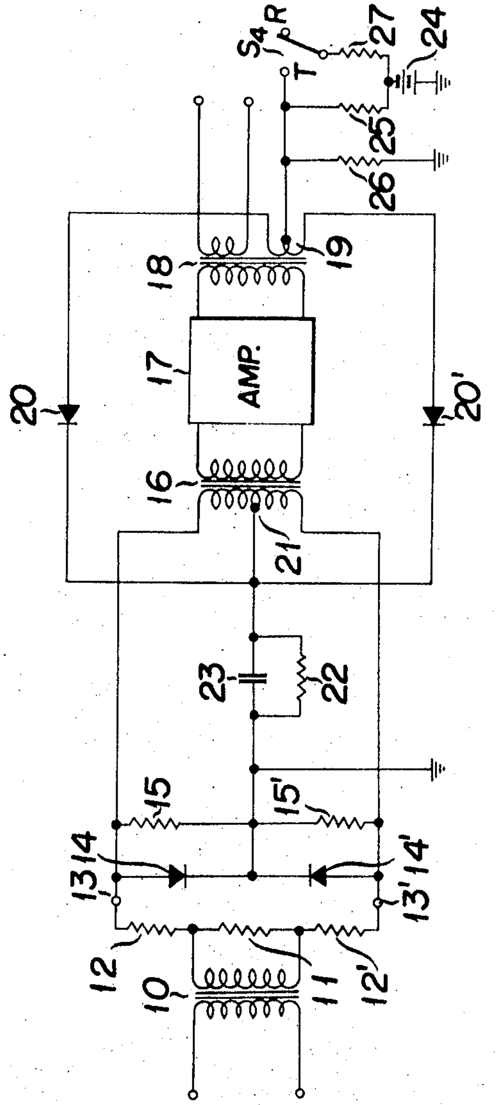
FIG. 2 is a circuit diagram showing one example of a compression type low-frequency amplifier utilized in the transceiver of this invention.

As shown by the connection diagram of FIG. 2, the compression type low-frequency amplifier 2 includes an input transformer 10, and a matching resistor 11 connected across the secondary winding of the input transformer. The opposite terminals of the matching resistor are connected to input terminals 13 and 13' which are balanced with respect to ground, respectively, through resistors 12 and 12′. Between these input terminals 13 and 13′ and ground are respectively connected diodes 14 and 14′ of the polarity shown in the drawing. Resistors 15 and 15′ are respectively connected in parallel with these diodes to compensate for disagreement of the characteristics thereof, and said input terminals 13 and 13′ are connected to opposite terminals of the primary winding of a coupling transformer 16, the secondary winding thereof being coupled with the primary winding of an output transformer 18 through a conventional linear amplifier 17. The output transformer 18 provides the output of the amplifier 17 on its secondary side in balanced relation with respect to the ground. On the secondary side of the output transformer 18 is provided a detector coil 19 adapted to derive out a portion of the output, the opposite terminals of the detector coil being connected to the neutral point 21 on the primary winding of the coupling transformer respectively through rectifying diodes 20 and 20′. The neutral point 21 is grounded through a parallel circuit comprising a resistor 22 and a capacitor 23 and serving as a filter circuit to filter out the rectified outputs of diodes 20 and 20′. Different DC biasing voltages from a DC source are alternately supplied to the neutral point of the detector coil 19 in interlocked relation with the switching operation between transmission and reception. More particularly, the positive terminal of a DC source 24 is grounded whereas its negative terminal is connected to the neutral point of the detector coil 19 through a resistor 25. Further, this neutral point is grounded via a resistor 26. The negative terminal of the DC source 24 is also connected to one end of a resistor 27, the opposite end thereof being arranged to be selectively connected to said neutral point via a fourth transfer switch $S_4$ interlocked with the above mentioned press-to-talk switch 7. Thus, this fourth transfer switch $S_4$ is connected such that it will connect the resistor 27 in parallel with the resistor 25 during transmission but disconnect them during reception.

The operation of the novel transceiver constructed as above described is as follows: For transmission, the switching means 7 is thrown to the transmission side T to form a transmisison system consisting of the microphone 6, the compression type low-frequency amplifier 4, the transmission section 3 and the antenna 1 as shown in FIG. 1. Aural signals from the microphone 6 are supplied to the compression type amplifier 4. In this amplifier input signals of low levels are sufficiently amplified whereas input signals of high levels are amplified with lower amplification factor, thus averaging the entire signal levels. This compression action will be considered in more detail taken in connection with FIG. 2. When the input signal level is increased with the result that the secondary output of the output transformer comes to exceed a level which is predetermined by the source of DC biassing voltage 24, the excessive portions of the output voltage will be rectified by diodes 20 and 20′ to produce a DC voltage across the neutral point 21 on the primary coil of the coupling transformer 18 and the ground. This DC voltage will cause diodes 14 and 14′ to pass forward control current $Ic$. Inasmuch as the internal resistance of the diodes against AC signals is substantially inversely proportional to the magnitude of the control current $Ic$, the voltages appearing across the diodes would be compressed in accordance with the input signal level. If it is assumed now that the input voltage and the output voltage of the compression type amplifier are denoted by $Vi$ and $Vo$, respectively, then since $$Ic \propto Vo$$
$$Vo \propto Vi/Ic$$

the relation between the input and output voltages can be expressed by $$Vo \propto \sqrt{Vi}$$

As a consequence, input signals, such as voices, having very large variation in their levels are compressed by the compression type amplifier 4 into signals having increased average level and small difference in their levels.

Figure 3:
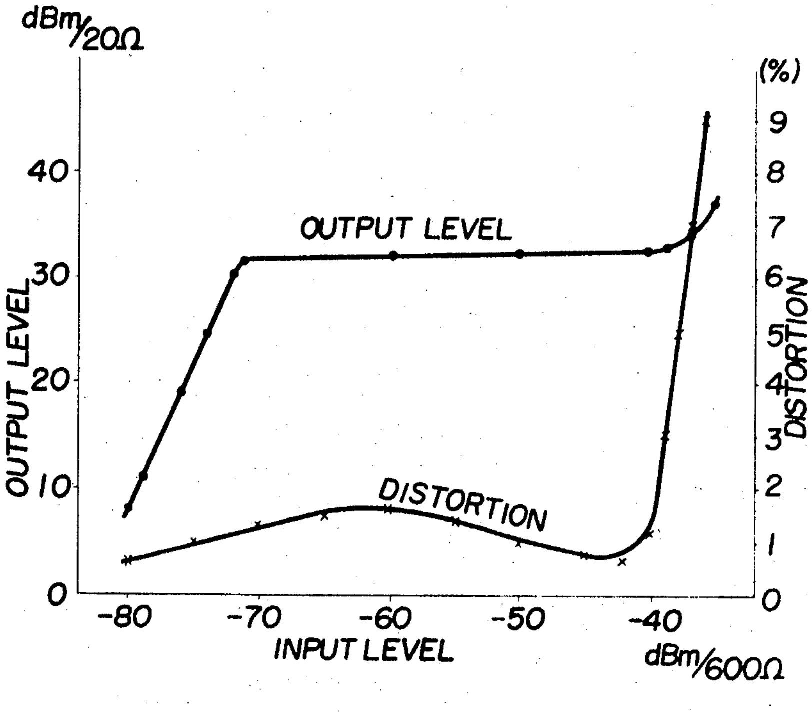
FIG. 3 shows characteristic curves of the compression type low-frequency amplifier.

FIG. 3 shows the input level vs. output level characteristic and the input level vs. output waveform distortion percentage characteristic of said compression type low-frequency amplifier. It is to be understood that these characteristics are plotted with a single input signal of 1 kc. As is evident from FIG. 3 the level width over which the output can be limited to a substantially constant level extends over a wide range of about 35 dbm./600 ohms.

Input signals thus compressed are then supplied to the transmission section 3 to effect amplitude modulation of carrier wave generated by a carrier oscillator installed in the transmission section 3. According to this invention, since the level of the compressed input signals is limited below a predetermined limit there is no fear of causing excessive or overmodulation even with sufficiently high degree of modulation of the transmission section 3. In addition, as the compressed input signals have an increased average level when compared with the original input signals it is equivalent to increasing the degree of overmodulation by the same amount. Further, as the compression type amplifier does not chop the signal wave as the clipper, generation of higher harmonics is negligible, thus greatly decreasing distortion of the signal wave.

To receive signals, the press-to-talk switch 7 is thrown to the reception side R to form a reception system consisting of the antenna 1, reception section 2, compression type low-frequency amplifier 4 and the receiver 5 as shown in FIG. 1. Received waves which are introduced from the antenna 1 are amplified and demodulated by a reception section 2 including a high-frequency stage, a local oscillator, an intermediate-frequency amplifier, a demodulator (all not shown) and the like and the output from the reception section 2 is supplied to the compression type amplifier 4. As mentioned above, this amplifier 4 has an automatic gain control function such that small input signals are sufficiently amplified whereas large input signals are amplified with smaller amplification factor so that it can provide distortionless output signals having an averaged level, thus reproducing voices of good quality from the receiver 5. Accordingly, it is not necessary to provide any particular automatic gain control circuit for the receiver. The compression level of the compression type low-frequency amplifier 4 is varied between transmission and reception of signals by the fourth transfer switch $S_4$ which is interlocked with the switching means provided in the bias circuit utilizing the DC source 24. More particularly, during transmission, as the resistor 27 is connected in parallel with the resistor 25 by the fourth transfer switch $S_4$ the current supplied by the DC source 24 and flowing through the resistor 26 is increased to increase the biassing voltage. Thus, the compression level is elevated to increase the output as a whole, thus enabling the carrier wave to be modulated with sufficiently large power. On the other hand, during reception the biasing voltage is decreased to lower the compression level. Thus the received power is decreased so as to generate sounds of moderate volume from the receiver.

As has been described hereinabove since in the transceiver of this invention the aural input signals are modulated by the compression type low-frequency amplifier, it is possible to increase the average degree of modulation and hence to greatly increase the distance of transmission of transmitted waves without the accompanying risk of overmodulation. Further, in the novel transceiver, as the aural input signals are compressed by means of the compression type low-frequency amplifier instead of being chopped distortion of the waveform is very little thus enabling sounds of exceedingly high quality to be produced. In addition, in the novel transceiver, since the compression type low-frequency amplifier is utilized in common for both transmission and reception systems, the construction of the circuit is greatly simplified. Moreover, the quality of the sound reproduced by the receiver is improved because this amplifier acts as an automatic volume controller in the reception system.

While in the above descriptions regarding FIGS. 2 and 3, the electron tubes have been shown as comprising two storage targets, it will be clear that more than two storage targets can also be used. It will also be apparent that various modifications and changes may be made without departing from the spirit and scope of the invention.

What is claimed is:

1. A transceiver comprising:
- an antenna;
- a reception section coupled to said antenna to demodulate electric waves received from said antenna;
- a compression type low-frequency amplifier including:
  - a source of reference voltage;
  - two signal input terminals which selectively receive the output from said reception section, said input terminals being balanced with respect to said reference voltage level;
  - two diodes respectively connected with the same polarity between each one of said input terminals and said reference voltage, the internal impedance of said diodes varying in accordance with the input signal level;
  - a pair of resistors respectively connected in parallel with said diodes;
  - an amplifier section to amplify the voltage across said two input terminals;
  - means for deriving out a portion of the output from said amplifier section in a balanced relation with respect to said reference voltage level;
  - a rectifier circuit to rectify the portion of the balanced output signals derived from said amplifier section; and
  - a filter circuit coupled to the output of said rectifier circuit to generate a forward biasing voltage for each of said two diodes, the magnitude of said forward biasing voltage being a function of the output of said rectifier circuit;

- a transducer to convert the output signals from said compression-type amplifier into audio;
- a source of aural input signals;
- a transmission section coupled to said aural signal input source for generating a carrier, modulating said carrier with the input signal supplied thereto, and amplifying said modulated wave; and
- switching means to selectively simultaneously connect the input and output terminals of said compression type amplifier respectively with said aural signal input source and said transmission section and to connect said antenna with the output terminal of said transmission section, so that said compression type amplifier compresses the output aural signals from said microphone, thus increasing the mean degree gain control during reception.

2. A transceiver according to claim 1 wherein said source of aural input signals is a microphone.

3. A transceiver according to claim 2 wherein said source of reference voltage is a source of ground potential.

References Cited

UNITED STATES PATENTS

| | | | |
|---|---|---|---|
| 2,147,595 | 2/1939 | Hilferty | 325—18 X |
| 2,692,943 | 10/1954 | Reid | 325—18 X |
| 2,967,992 | 1/1961 | Scholten | 323—66 |
| 3,191,122 | 6/1965 | Hussey | 325—15 |

ROBERT L. GRIFFIN, Primary Examiner

BENEDICT V. SAFOUREK, Assistant Examiner

U.S. Cl. X.R.

179—170; 325—62; 330—129